Patented Jan. 15, 1935

1,988,109

UNITED STATES PATENT OFFICE 1,988,109

RECOVERY OF BERYLLIUM COMPOUNDS

John E. Bucher, Yellow Springs, Ohio, assignor to Antioch Industrial Research Institute, Inc., Yellow Springs, Ohio, a corporation of Ohio No Drawing. Application October 5, 1932, Serial No. 636,330

4 Claims. (Cl. 23—17)

This invention relates to the recovery of volatile beryllium compounds, and especially to the recovery of beryllium chloride vapors. More particularly, the invention relates to the recovery of volatile beryllium compounds by absorbing their vapors with materials which form a solution therewith, and at a temperature above the melting point of the solution which it is desired to recover.

In the production of beryllium and of various beryllium compounds, it has been customary heretofore to produce beryllium chloride or other volatile compounds of beryllium at high temperatures at which the compounds exhibit a relatively high vapor pressure. Thus, for example, in the production of beryllium chloride for reduction or electrolytic treatment in the preparation of metallic beryllium, it has been customary heretofore to react beryllium oxide with a chlorinating agent in the presence of a reducing agent at a high temperature at which the beryllium chloride sublimes almost as fast as it is formed. The collection of this beryllium chloride vapor has presented a very difficult problem which has, in a large measure, stood in the way of the commercial development of the process. Unless the mixture of the beryllium chloride vapors with the by-product gases is cooled, the beryllium chloride remains largely as a vapor, and its separation from the other gases has been regarded as substantially impossible, whereas if the gases are cooled, the beryllium condenses partly as a fog, from which its separation is extremely difficult, if not impracticable, and partly as a massive solid or sublimate which tends very quickly to close off the tubes or other passages in the apparatus.

The beryllium chloride made in this way has, prior to this invention, been diluted with other substances in which it is soluble, in order to produce an electrolytic bath having more desirable qualities than the pure beryllium chloride and for other purposes I have now discovered that by combining these two operations into one the difficulties of the process are almost entirely eliminated, and that the inevitable waste in the old method of procedure can be avoided and the process carried on efficiently and economically.

According to my invention, the vapors of the volatile beryllium compound are passed over or through a mass of a material with which the beryllium chloride forms a solution, and the composition of the desired solution may be controlled by regulating the temperature at which the condensation is effected. In this manner, a substantially complete condensation of the volatile compound can be effected, even with the vapor at temperatures above the boiling point of the beryllium compound and the desired solution can be obtained directly and continuously with an automatically regulated composition, without need for any conscious proportioning of the ingredients.

As an example of my invention, beryllium chloride may be formed by reacting beryllium oxide with chlorinating and reducing agents, such as carbon monoxide and chlorine phosgene, carbon tetrachloride, sulphur monochloride, sulphuryl chloride, etc., at a temperature which causes the beryllium chloride to sublime from the reacting mass. The exit gases from the reaction chamber may then be passed through a mass of sodium chloride in lump form and the temperature of the sodium chloride mass may be held as nearly as is practicable at 215° C. The result will be a substantially complete condensation of the beryllium chloride vapor from the exit gases onto the sodium chloride where it forms a eutectic solution with the sodium chloride. Since the eutectic is the only composition of these two substances which will melt at a temperature as low as 215° C., the liquid solution which drains from the condensing chamber will necessarily have that composition.

If a composition richer in sodium chlorde is desired, the temperature of the sodium chloride mass may be maintained at a higher temperature corresponding approximately to the melting point of the desired composition. If a composition richer in beryllium chloride is desired, a eutectic may be formed and the eutectic held at a temperature approximately corresponding to the melting point of the desired composition and exposed to the beryllium chloride vapors until solidification occurs.

In order to maintain the exact composition which melts at the chosen temperature, it is necessary that an equilibrium be attained, that is to say, the beryllium chloride vapor and the mixture of beryllium chloride and the condensing agent must pass over sufficient surface of the condensing agent and for a sufficient length of time to allow it to reach an equilibrium condition. If the beryllium chloride vapor is in quite concentrated form (as it would be in the preferred process) and is allowed to impinge against a condensing agent with comparatively small surface, e. g., in large solid lumps, and particularly if the condensing agent is at a temperature which does not cause too rapid solution, the beryllium chloride may condense and run off as a liquid from the condensing agent before it has had time to dissolve much of the condensing agent. In this case, no equilibrium has been attained, but by proper control of the conditions, a substantially uniform composition may be secured, and this procedure being simpler and more economical than that suggested above may be used where a composition richer in beryllium than the eutectic is desired.

The beryllium chloride vapors or the exit gases containing such vapors may be passed over or through the condensing material, whether in solid, granular or fused form, and it is to be understood, of course, that other condensing materials may be used in place of the sodium chloride, and may include either single compounds or mixtures of compounds. In some cases, the condensing substance may be one which combines with the beryllium compound to form a desired compound, e. g., a double halide. In choosing the condensing substance, the use to which the resulting composition is to be put should, of course, be kept in mind. Thus, for example, if the mixture is to be used for the production of metallic beryllium, the condensing material chosen should be such that it will not objectionably interfere with the production of the metal, nor introduce undesired metals by release of a metal constituent from the compound used for condensing; it should preferably not be very volatile at the temperatures used in the production of the metal, and advantageously it should be such that either alone or with the addition of other suitable materials it will form an inert floating bath or flux on the molten metal produced in the process. Aside from these considerations, the important factor which will govern the choice of such a compound is the ability of the material to reduce the vapor pressure of the beryllium chloride. When these considerations are borne in mind, there will be little difficulty in choosing numerous materials suitable for the purpose of this invention.

Other substances which may be used in my process include lithium chloride, which forms a eutectic with beryllium chloride, melting at approximately 300° C.; barium chloride, which forms a eutectic melting at approximately 372° C.; calcium chloride, magnesium chloride, and zinc chloride. When the chloride of potassium is used, there will be no objectionable reduction with metallic sodium, and consequently the mixture may be used for the production of metallic beryllium by reduction with sodium. The chlorides of barium, magnesium, calcium and zinc, however, are likely to be reduced by the sodium if the mixture is used in a reducing process. Such mixtures, however, can be used satisfactorily to produce beryllium by reduction with the corresponding metals, i. e., magnesium, calcium, barium, etc., or other metals which reduce beryllium, but do not reduce the metal of the accompanying chloride.

What I claim is:

1. The method of forming beryllium chloride-sodium chloride mixtures which comprises forming the beryllium chloride at a temperature at which it is volatalized, passing the vapors thereof over solid sodium chloride, maintaining the surface of the sodium chloride at the melting point of the desired mixture and draining off the resulting liquid mixture.

2. The method of condensing beryllium chloride into a solution of desired composition which comprises passing the vapor thereof over the solute in solid form, maintaining the temperature of the solute approximately at the melting point of the desired composition, and removing the condensed beryllium chloride with dissolved solute in liquid form from the remaining solid solute.

3. The method of condensing vapors of a volatile beryllium compound and forming a predetermined composition thereof with a substance with which it dissolves which comprises passing said vapors into intimate contact with the solid substance which forms a liquid solution therewith, maintaining the temperature at the surface of contact between the vapor and said substance substantially at the melting point of the desired composition, and withdrawing said composition from exposure to the vapor when change to a liquid occurs.

4. The method of condensing vapors of a volatile beryllium compound and forming a predetermined composition thereof with a substance with which it dissolves which comprises passing said vapors into intimate contact with a solid substance which forms a liquid solution therewith, maintaining the temperature at the point of contact substantially at the melting point of the desired composition, and removing the composition as a liquid.

JOHN E. BUCHER.